May 28, 1963   R. SCHUMACHER   3,091,730
POWER SUPPLY APPARATUS
Filed July 11, 1960   3 Sheets-Sheet 1
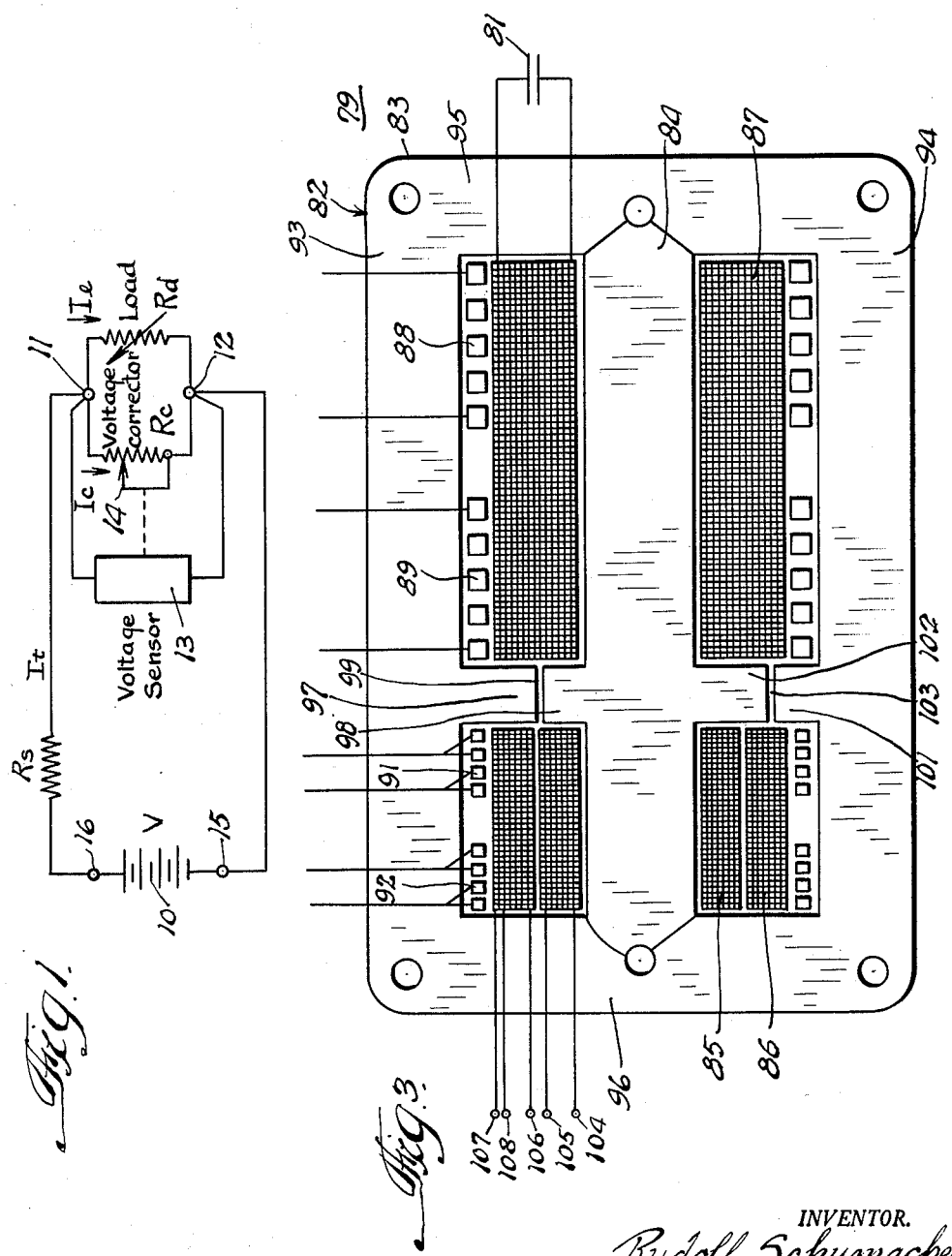
INVENTOR.
Rudolf Schumacher
BY
Olson, Mecklenburger, von Holst,
Pendleton & Neuman.

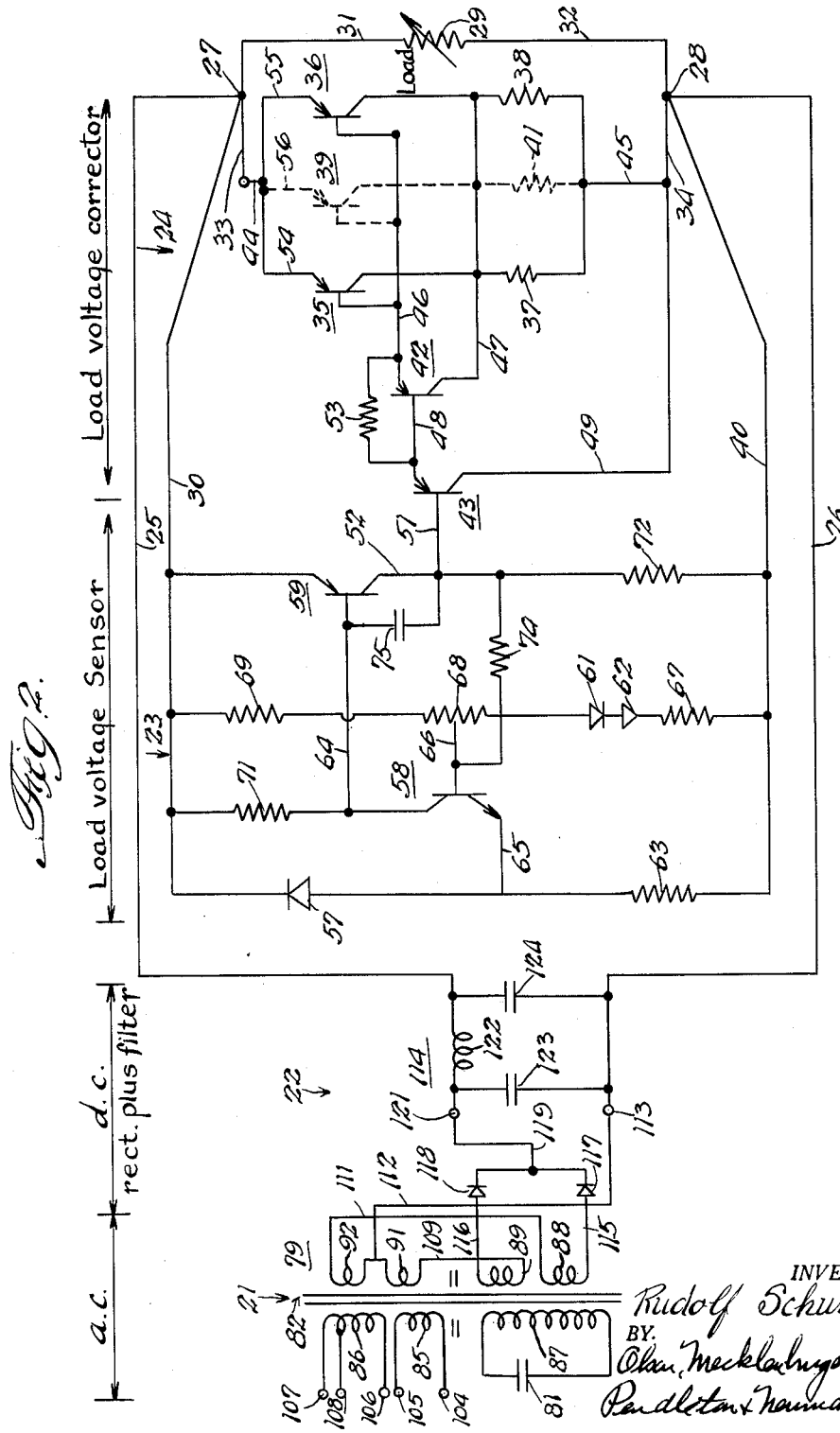

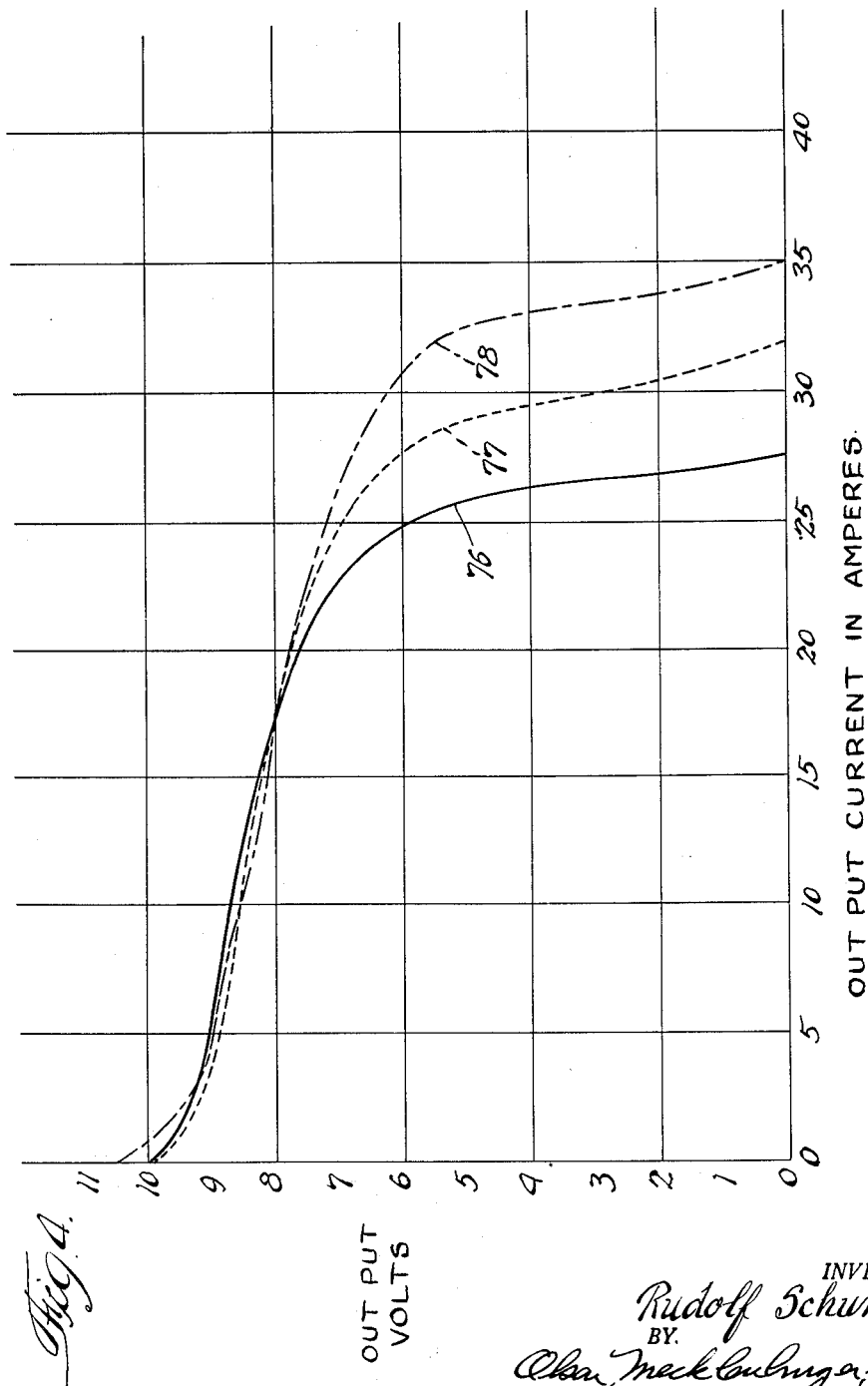

United States Patent Office 3,091,730
Patented May 28, 1963

3,091,730
POWER SUPPLY APPARATUS
Rudolf Schumacher, Addison Township, Du Page County, Ill., assignor to Basic Products Corporation, West Milwaukee, Wis., a corporation of Wisconsin
Filed July 11, 1960, Ser. No. 42,157
18 Claims. (Cl. 321—16)

This invention relates to power supply apparatus for operation from an A.C. source of nominal voltage and frequency, more particularly, to D.C. power supply apparatus, and it is an object of this invention to provide improved apparatus of this character.

It is a further object of the invention to provide improved regulating apparatus for supplying a certain D.C. voltage to an external load from an A.C. voltage source or line supply of nominal magnitude and frequency irrespective of variations in such load within a specified range and irrespective of variations in such magnitude within a specified range.

It is a further object of the invention to provide improved apparatus for the purposes indicated, wherein the voltage regulation for variations in external load is achieved by sensing voltage changes and applying a corrective flow of current, that is, through the use of a closed loop corrective system.

Power supply apparatus for providing a regulated D.C. voltage from an A.C. source wherein both load changes and line supply voltage changes are taken into account, are well known, such apparatus being shown in the Hjermstad Patent No. 2,804,588, dated August 27, 1957. In the system as disclosed by the Hjermstad patent, a combination of components including constant voltage transformer apparatus of the type exemplified by the Sola Patent No. 2,143,745, dated January 10, 1939, a low resistance rectifier and a filter circuit comprising capacitors of very high microfarad value are connected together to give the regulated voltage across the external load when the transformer is supplied with voltage from an appropriate source. This system is of the open loop type in that the voltage correction across the external load is achieved solely by the inherent functionings of the components as constructed. There is no sensing of voltage changes which sensings can be used to apply corrective influences. Accordingly, apparatus of the nature disclosed in the Hjermstad patent, which apparatus has had wide acceptance, represents a compromise between attempting to achieve good voltage regulation for variations in external load at the expense of regulation for variations in line supply voltage, or on the other hand, between good regulation for changes in line supply voltage at the expense of regulation for variations in load.

While the subject invention makes use of certain of the basic components as disclosed in the Hjermstad Patent No. 2,804,588, certain of these components are modified in accordance with the inventive teaching of the subject application, in order to achieve the improved results, as will be pointed out subsequently in this specification.

It is a further object of the invention to provide a closed loop regulating system of the nature and for the purposes indicated, which will provide in combination a network delivering a constant voltage at a fixed current for changes in magnitude of the line supply voltage and a circuit including sensing means for applying corrections to the voltage as required by changes in load.

It is a further object of the invention to provide improved apparatus of the character indicated which is relatively simple in form, efficient in operation and of reduced size and weight.

It is a further object of the invention to provide improved apparatus of the character indicated which has rapid response to changes in external load or line supply voltage and which has improved performance under transient conditions.

It is a further object of the invention to take advantage of developments in the field of semi-conductor devices such as transistors to achieve an improved operating apparatus.

Recent developments in the field of computers, for example, have made it imperative to have power supply apparatus which will deliver substantial currents at low voltages, for example, currents of the order of 12½ amperes at 8 volts D.C., as will be described in connection with one form of apparatus made in accordance with the invention. Such power supply apparatus must regulate the load voltage, 8 volts for example, within a range of one-tenth of one percent or better. In apparatus of this kind, internal resistance or impedance drops, when not corrected, affect the external voltage unduly when load variations occur and ordinarily has a detrimental effect. That is, the drooping volt-ampere characteristic at the load terminals of power supply devices generally is not desirable. The drooping volt-ampere characteristic however is made use of, according to the subject invention, to provide the error signal or sensing signal which brings into operation the corrective influence as will be described.

In carrying out the invention in one form, regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range is provided comprising, a shunt circuit connected to said pair of terminals, means for varying the current through said shunt circuit in inverse proportion to the current of such load, means responsive to variations in such load for controlling said current varying means, and a network having a drooping volt-ampere output characteristic at said full load current plus control current and said certain D.C. voltage connected between such source and said terminals for supplying a substantially constant D.C. current of essentially said full load value plus control current at said certain D.C. voltage to said terminals irrespective of variations within the specified range of such A.C. voltage magnitude.

Additional objects and advantages of the invention will become apparent as the description proceeds and the functioning of the invention may be better understood by reference to the accompanying drawings to which, FIGURE 1 is a generalized schematic circuit diagram for explaining certain principles of the invention;

FIG. 2 is a circuit diagram of actual apparatus constructed according to the invention;

FIG. 3 is a top view of a high reactance transformer partially in section which forms a part of the apparatus illustrated in FIG. 2, and FIG. 4 is a graph showing the volt-ampere characteristics of a portion of the apparatus illustrated in FIG. 2.

Referring more particularly to FIG. 1, which is a generalized schematic circuit diagram for explaining certain principles of the invention, there is shown a battery 10 of voltage V connected to terminals 11 and 12, through a series resistance $R_s$, across which terminals a load resistance $R_d$ and a voltage correcting resistance $R_c$ in parallel are connected. Also connected across terminals 11 and 12 is a voltage sensing mechanism 13, which is operatively connected to a movable tap 14 for varying the resistance of the correcting resistor $R_0$.

It is assumed for purposes of explanation, that the voltage V of battery 10 across terminals 15 and 16 is constant. It is also assumed that all of the series resistance, internal of and external to the battery 10, including that of the leads, is constant and is lumped together and included in the resistance $R_s$. Accordingly, it will be evident from Ohm's law considerations that the total current $I_t$ flowing from battery 10 through resistance $R_s$ to terminals 11 and 12 and through the parallel combination of load resistance $R_d$ and correcting resistance $R_c$, will have a value determined by the total resistance made up of $R_d$, $R_s$ and $R_c$. If it be assumed that the parallel combination of $R_d$ and $R_c$ is a constant resistance, irrespective of the current through the load $R_d$, it is evident that the total resistance in the battery circuit is constant and therefore the total current $I_t$ is constant. From this it follows that the voltage at terminals 11 and 12 will be constant.

Accordingly, it is necessary that the voltage sensing mechanism 13 cause the tap 14 to vary the resistance of $R_c$ inversely to that of $R_d$. Thus, for example, if $R_d$ is equal to one value at full load current therethrough, i.e., external load current, and $R_c$, under this condition is equal to infinity, that is to say, open circuit, the load current $I_1$ will be equal to the total current $I_t$ and the voltage across terminals 11 and 12 will be the product of the load resistance and $I_t$. Correspondingly, when the external load current is zero, that is $R_d$ is infinity, the only resistance in the circuit is that of the voltage corrective resistance $R_c$ and if under this condition, the resistance of $R_c$ is equal to the full load value of resistance $R_d$, the total current $I_t$ flowing in the circuit will, of course, be equal to the correcting current $I_c$ through the voltage corrector which is also equal to the external load current $I_1$ under full load conditions. Thus, under open circuit of the load $R_d$, the voltage across terminals 11 and 12 remains at the same value as when the external load current is at full load because the total current $I_t$ remains constant, i.e., the resistance drop across $R_s$ determines the voltage at terminals 11 and 12.

It is the function of the voltage sensor 13 to change the resistance of the voltage corrector resistance $R_c$ from the full load value of $R_d$ to infinity. This may be achieved by considering that under the particular circumstances, if the value of load resistance $R_d$ is increased, the resistance of the parallel combination of $R_c$ and $R_d$ is momentarily increased, thereby causing a momentary decrease in the total current $I_t$ and a momentary increase in the voltage across terminals 11 and 12. Sensor 13 senses this increase in voltage and causes the tap 14 to move so as to decrease the resistance value of resistor $R_c$ until the parallel combination of $R_c$ and $R_d$ is the same as when the operation started whereby $I_t$ resumes its original value and the voltage across terminals 11 and 12 also resumes its original value. Correspondingly, if the load resistance $R_d$ should decrease there will be a momentary decrease in the resistance of the parallel combination of $R_c$ and $R_d$, resulting in a momentary increase in the total current $I_t$, and consequently a momentary decrease in the voltage across terminals 11 and 12. Sensor 13 senses this decrease in the voltage and causes the tap 14 to move so as to increase the resistance value of voltage correcting resistor $R_c$ until the resistance of the parallel combination of $R_c$ and $R_d$ is the same as originally. Thereupon the total current $I_t$ assumes its original value and the voltage at terminals 11 and 12 also assumes its original value.

In summary, it may be stated that for a fixed value $V$ of the voltage of battery 10, the voltage sensor 13 and the voltage correcting resistance $R_c$ must function to maintain the total resistance of the parallel combination of $R_d$ and $R_c$, constant, which is to say, that the total current $I_t$ is a constant. The voltage sensor 13 detects any voltage decrease or voltage increase and utilizes the difference voltage to provide a correction in the resistor $R_c$.

The volt-ampere characteristic of battery 10 and resistance $R_s$ as determined at the terminals 11 and 12 for varying values of load and, of course, in the absence of the correcting resistance $R_c$, is a downwardly sloping or drooping line which represents the resistance drop across $R_s$ as decreasing the voltage $V$ of battery 10.

Since in the explanation of FIG. 1, the battery 10 represents the voltage source or the line supply voltage, it is evident that structures which also take into account changes in line supply voltage require additional cooperating apparatus.

Referring now to FIG. 2, there is shown a circuit diagram of apparatus according to the invention for maintaining the voltage across a load constant irrespective of variations in the load and irrespective of variations in line or supply voltage over rated ranges of variations of these factors. The apparatus as shown in FIG. 2, comprises an A.C. portion 21, a D.C. portion 22, a load voltage sensor 23, and a load voltage corrector 24. The A.C. and D.C. portions 21 and 22, supply a D.C. voltage through conductors 25 and 26 to terminals 27 and 28, across which the load 29 may be connected by means of conductors 31 and 32. The load voltage sensor 23 is connected to terminals 27 and 28 by means of conductors 30 and 40 and the load voltage corrector 24 is connected to load terminals 27 and 28 by means of conductors 33 and 34.

The load voltage corrector 24, as shown, consists of a plurality of transistors and resistors of which transistors 35 and 36 in parallel are shown in solid lines in series with resistors 37 and 38 also shown in solid lines. A transistor 39 is shown in dotted lines to indicate that any number of transistors, including only one if desired, may be used in order to accommodate the desired load current and absorb the necessary power in connection with the series resistors. One or more resistors may be used, as desired, as is shown by the inclusion of resistor 41 shown in dotted lines. The load voltage corrector 24 as shown, also includes transistors 42 and 43, connected in circuit for controlling the current through transistors 35, 36, 39 etc., as will be more fully described.

The transistors 35, 36, 39 etc. in a circuit which was actually constructed and operated, were germanium power transistors of the PNP type, designated as 2N627, by the manufacturer thereof, had their emitters connected to conductor 44 and thus to conductors 33, and had their collectors connected through resistors 37, 38, 41 etc., to conductor 45 and thus to conductor 34 and terminal 28. The base of each of transistors 35, 36, 39 etc. is connected to a conductor 46 to the emitter of transistor 42, and the collector of transistor 42 is connected by means of the conductor 47 to each of the collectors of the transistors 35, 36, 39 etc. The base of transistor 42 is connected by means of a conductor 48 to the emitter of transistor 43 and the collector of transistor 43 is connected by means of conductor 49 to conductor 34. The base of transistor 43 is connected by means of conductor 51 to conductor 52 through which the control from the voltage sensor 23 is applied to the voltage corrector 24. The transistors 42 and 43, in the actual construction referred to, also were of the PNP type identified as 2N627. A resistor 53 is connected from conductor 46 to conductor 48, that is, across the emitter and base of transistor 42 for a purpose to be given subsequently.

The transistors 35, 36, 39 etc. and resistors 37, 38, 41 etc. together form a circuit in shunt to the load resistance 29, and the external load 29 together with the shunt circuit so formed, essentially, form the total load at terminals 27 and 28 which the A.C. and D.C. components 21 and 22 have to supply. In addition to the load formed by the said shunt circuit and the external load 29, certain other load current components must be considered in the completed structure. Thus the transistors 35, 36, 39 etc. and transistors 42 and 43 require certain currents flowing through their bases for control purposes. Also as will be described, certain additional components of current flow in the load voltage sensor mechanism 23 and some provision, in the form of additional load current, must be made for aging of the transistor devices.

The actual device to which reference has been made hereinbefore and to which reference will be made hereinafter, was designed to supply an external load 29 of 100 watts, namely 12.5 amperes at 8 volts. That is, the power supply apparatus was designed to maintain 8 volts at terminals 27 and 28 with a permissible variation of one-tenth of one percent, for variations in external load 29 from zero amperes to 12.5 amperes, that is, load resistance variations from infinity to 0.64 ohm. To achieve this result with the components as thus far described and those which will be subsequently described, it was found essential to provide a current of about 17.5 amperes flowing through conductors 25 and 26 to terminals 27 and 28. The additional current of 5 amperes was necessary to provide for control of the various transistors, to provide for their aging and to compensate for ripple in the output voltage, all such components whether one or more is involved, being considered together in this specification and referred to as control current. It should be understood that the amount of control current needed may vary widely depending upon the nature of the currents utilized, and could be negligible in some cases.

In any event the shunt circuit consisting of the transistors 35, 36, 39 etc. and resistors 37, 38, 41 etc. must be able to accommodate the current required by the external load 29, as pointed out in connection with consideration of the simplified circuit of FIG. 1. Thus, when the external load 29 is zero amperes (infinite resistance or open circuit), the shunt circuit must have flowing in it the full load current of 12.5 amperes plus certain control current. Correspondingly, when the external load resistance 29 is at its full load value, that is, 12.5 amperes (resistance 29 equals .64 ohm), the shunt circuit must accommodate zero current plus certain control current. In essence, the current through the shunt circuit varies inversely relative to the current through external load 29, but actual inverse proportionality may not be achieved because the control current must be accommodated in the shunt circuit. The total current at terminals 27 and 28 within the limits required by the device must remain a constant.

The number of transistors 35, 36, 39 etc. is selected in connection with the resistors 37, 38, 41 etc. in order to dissipate the power required and for economic reasons it is desirable that the major portion of the dissipated power be accommodated by the resistors, since these components cost far less than the transistors. The transistors may be considered as control elements in the shunt circuit.

The resistance of the resistors 37, 38, 41 etc. may be determined by considering that the transistors 35, 36, 39 etc. are operated at full capacity, that is, with saturation current flowing therethrough when the shunt circuit is conducting maximum current which for the practical device described was 17.5 amperes. The voltage drop from emitter to collector of transistors 35, 36, 39 etc., when the saturation current was flowing, was about 1 volt. Thus, the voltage appearing across resistors 37, 38, 41 etc. was about 7 volts, since the output voltage of the device was 8 volts. Since the shunt circuit must accommodate 17.5 amperes (while the external load requires only 12.5 amperes), at 8 volts, it is evident that the shunt circuit and the control components consumed about 140 watts of which wattage about 17.5 watts (corresponding to 1 volt) was consumed by the transistors 35, 36, 39 etc. and 122½ watts (corresponding to 7 volts), was consumed by the resistors 37, 38, 41 etc. As the currents through the shunt circuit and in external load 29 change, the proportionate shares of the watts consumed by the transistors and the resistors change. The watts consumed by the transistors may increase somewhat over the value indicated because of the increase in resistance of these devices as currents decrease.

In the actual construction referred to, satisfactory operation was obtained by utilizing six transistors (corresponding to 35, 36, 39 etc.) of the 2N627 type, whereby each of the transistors carried a maximum of about 2.8 amperes. Computations from Ohm's law indicate that the combined resistance of resistors 37, 38, 41 etc. should be about .4 ohm, and, correspondingly, the lowest total resistance of transistors 35, 36, 39 etc. should be about .057 ohm, that is, substantially less than the resistance of the resistors 37, 38, 41 etc. The resistance of the transistors increases as the current therethrough decreases, reaching high values when the only current flowing is control current. Apart from the influence of control current on the value of the total resistance in the shunt circuit of transistors 35, 36, 39 etc. and resistors 37, 38, 41 etc. the lowest value of such total resistance should be substantially equal to the full load resistance of the load 29. In the actual construction four resistors of about two ohms each were connected in parallel to achieve satisfactory operation. Some initial adjustability of these resistors may be provided, if necessary, for adjusting the circuit to produce the refined operation desired. To assume proper division of current among the transistors 35, 36, 39 etc., the conductors 54, 55, 56 and so forth, may be provided with a small amount of resistance, for example, sufficient to cause about a three-tenths of a volt drop in each of these conductors.

The value of current in the shunt circuit of transistors 35, 36, 39 etc., is controlled by the amount of current flowing in the bases of these transistors, the amount of base current of transistors 35, 36, 39 etc. is determined by the amount of current flowing from the emitter to the base of transistor 42 (from conductor 46 and conductor 48), the amount of base current of transistor 42 is determined by the current from the emitter to the base of transistor 43, that is to say, from conductor 48 to conductor 51, and the base current of transistor 43 is controlled by the potential existing on its base as already indicated. Thus a relatively small current in the emitter to base circuit of transistor 43 controls a substantially larger current (by the amount of the total amplification) in the emitter to collector circuit of transistors 35, 36, 39 etc. When the potential on conductor 51 is such as to remove forward bias from transistor 43, this transistor is nonconductive in its emitter-collector circuit and permits no current flow in conductor 48. Accordingly, transistor 42 is nonconducting and thus no current flows in conductor 46, and consequently transistors 35, 36, 39 etc. are nonconductive because no base current flows. On the other hand, when the potential on conductor 51 is sufficiently low, saturation current flows in the circuit of transistor 43. Then transistor 43 is biased for maximum conduction whereupon saturation current flows from emitter to base of transistor 42 to bias this transistor for maximum conduction, whereupon sufficient base current flows in transistors 35, 36, 39 etc. to bias these transistors completely on thereby permitting the full or saturation current to flow. Depending upon the potential on conductor 51 varying degrees of conductivity are established upon transistors 43, 42, and 35, 36, 39 etc., whereby the current through transistors 35, 36, 39 etc. is controlled to any value between the limits of zero and maximum. A resistor 53 is connected across the emitter and base of transistor 42, producing additional current between these two members to transistor 43.

Control of the voltage on conductor 51 in order to control the shunt circuit of transistors 35, 36, 39 etc., that is, the operation of the load voltage sensor 23, will now be explained.

The sensing circuit 23 functions to detect voltage increases or voltage decreases across terminals 27 and 28 and includes a Zener diode 57 and transistors 58 and 59, the circuit for controlling transistor 58 including two diodes, 61 and 62, for temperature compensation purposes in the complete circuit of the voltage sensor 23 and correcting circuit 24.

The Zener diode 57 is a device for permitting reverse currents to flow only after a certain voltage appears thereacross and having, at such a voltage, a fairly sharp transition from nonconduction to conduction, this property being made use of for the primary control functions of transistors 58 and 59 and thus of the voltage on conductor 51. In the particular circuit referred to, the Zener diode 57 (of the silicon type, designated as SV1005 by the manufacturer thereof), begins to conduct current at around 5 volts and is connected in series with a resistor 63 across the conductors 30 and 40, the resistor 63 having a value of 270 ohms. Thus, at 8 volts for which the circuit was designed to regulate, the Zener diode 57 would have 5 volts across it and resistor 63 would have 3 volts across it.

The voltage on conductor 51 is determined by the current in the emitter-collector circuit of transistor 59 and the conducting condition of transistor 59 is determined essentially by the voltage on its base which in turn is determined by the conducting condition of the emitter-collector circuit of transistor 58, the base of transistor 59 being connected to the collector of transistor 58 by means of conductor 64. The conducting condition of the emitter-collector circuit of transistor 58 is determined essentially by the difference between the voltages on its emitter and its base as determined by the voltages on conductors 65 and 66, the voltage on conductor 65 being determined by the voltage drop across resistor 63 and the voltage on conductor 66 being determined by the voltage drop across the resistor 67, the diodes 61 and 62 and a portion of the resistor 68, all of which are in circuit with a resistor 69 and connected across conductors 30 and 40. The emitter-collector circuit of transistor 58 includes a resistor 71 of about 1000 ohms. The emitter-collector circuit of transistor 59 is connected across conductors 30 and 40, and includes a resistor 72 of 820 ohms and conductor 52.

The transistor 58 as used in the actual circuit was a silicon transistor of the NPN type designated 2N333 by the manufacturer thereof, and the transistor 59 as used in the actual circuit was a germanium transistor of the PNP type designated 2N525 by the manufacturer thereof.

The sensing circuit 23 and the corrector or shunt circuit 24 being a portion of the error correcting network, require a high degree of amplification of the error or difference voltage in order to maintain the output voltage within the desired limits. For this purpose, a resistor 74 of 33,000 ohms value in the actual case was connected from conductor 52 to conductor 66, thereby feeding back a small portion of the amplified signal of transistor 59 to the input circuit of transistor 59. Very small changes in voltage across terminals 27 and 28, such as of the order of a few millivolts, will be detected by the Zener diode 57 and the small current flowing as a result thereof is amplified through transistors 58, 59, 43, 42 and 35 to control the substantial currents in transistors 35, 36, 39 etc. The high degree of amplification results in rapid response and accurate control within the limits desired. Swings in voltage caused by the efforts of the sensing circuit to correct for voltage changes and for ripple are minimized by a capacitor 75 connected across the base and collector of transistor 59, in the actual circuit, this capacitor having a value of .02 microfarad. Further operation of the sensing and voltage corrector circuits for variations in external load 29, will be described subsequently in the specification.

The A.C. portion 21 and the D.C. portion 22 of the circuit, according to the invention, will now be described in connection with FIGURES 2, 3 and 4.

Portions 21 and 22 when energized, as will be described, produce, apart from the voltage correcting and voltage sensing networks 23 and 24 respectively, the volt-ampere characteristics at terminals 27 and 28 as shown by the curves 76, 77 and 78 of FIG. 4. These curves are plots of output volts against output amperes for three different input voltages to the A.C. portion of the apparatus. The A.C. portion 21 comprises a transformer 79 and a capacitor 81 forming a network of the ferro-resonant type, shown schematically in FIG. 2 and in somewhat greater particularity in FIG. 3. The transformer 79 and capacitor 81, while resembling the structures shown in the Hjermstad patent, No. 2,804.588, and the Sola patent, No. 2,143,745, hereinbefore referred to, differs therefrom in certain respects whereby the necessary cooperation required for the several components of the subject invention is achieved. Thus, the transformer and capacitor networks of the patents referred to, in and of themselves, were intended to achieve constant output voltage with varying line supply voltages and also to achieve a certain output voltage regulation for variations in load. The transformer and capacitor network of the subject invention is intended to produce a dropping volt-ampere characteristic rather than a non-drooping or constant voltage characteristic for changes in load and to produce, as nearly as possible, an intersection of the volt-ampere characteristics at a certain value of current and a specified voltage. So long as an intersection of the volt-ampere characteristics occurs at the operating point, or at least the characteristics are very close to each other at the desired voltage and current of the operating point and the characteristics are drooping so that the voltage sensing circuit, as described, can obtain an error voltage based upon which to apply a corrective influence, it is not of critical importance what the volt-ampere characteristics are beyond the operating point. For the volt-ampere characteristic to have the desired properties as described, it has been found necessary to utilize a transformer-capacitor network of the ferro-resonant type.

Referring to FIGS. 2 and 3, the transformer 79 includes a core 82 comprising an outer shell 83 and a central leg 84 upon which are disposed the primary windings 85 and 86 and secondary windings 87, 88, 89, 91 and 92.

The transformer core as shown may be of the pressed-in type although other forms of cores may be used. The outer shell 83 includes side legs 93 and 94 and end legs 95 and 96. Extending inwardly from the side leg 93 is a shunt portion 97 and extending outwardly from the central leg 84 is a shunt portion 98, including between them a nonmagnetic gap, for example, an air gap 99. Similarly, the side leg 94 includes an inwardly extending portion 101 and central leg 84 includes an outwardly extending portion 102, including between them a nonmagnetic gap, for example, an air gap 103. The shunts 97, 98, 99 and 101, 102, 103 divide the core into primary and secondary portions and form a high reactance transformer inasmuch as flux generated by the secondary winding 87 can link itself through the shunts without at the same time linking the primary windings 85 and 86. Similarly, a portion of the fluxes generated by the primary windings 85 and 86 can link themselves without at the same time linking the windings on the secondary portion of the core.

The dimensions of the core including the thickness of the stack, the number of turns in the primary windings 85 and 86 and the secondary winding 87, and the dimensions of the shunts 97, 98, 99 and 101, 102, 103 are selected in combination with the capacitor 81, so that a ferro-resonant type condition is achieved. In the resonant type condition, the essential phenomenon involved is that the portion of the central leg 84 underneath the secondary winding 87 has a high flux density, that is, it is at a high degree of saturation. This condition occurs because the capacitive reactance of capacitor 81 and the inductive reactance of the transformer are such that a relatively large current flows in the circuit of winding 87 and capacitor 81, this current giving rise to a large flux of such a direction that, in combination with the flux generated by the primary windings, it saturates the central leg 84. In the structure as shown in FIG. 3, the outer legs 93 and 94 together have a total cross-sectional area greater than that of the central leg 84, in order to prevent stray fields externally of the core.

By virtue of the high flux density conditions described, the differences in output voltage for differences in input or line voltage are relatively small, as may be seen in FIG. 4, wherein the volt-ampere characteristics 76, 77 and 78 from about two and one-half to twenty amperes are fairly close together.

It is advantageous, although not necessary, in ferro-resonant type circuits of the character involved, from an economic standpoint, to utilize a capacitor 81 of low microfarad and fairly high voltage rating. Thus, the capacitor 81 in the transformer combination of the actual device constructed had a value of 3.5 microfarads and was rated at 660 volts. To cooperate with this capacitor, the winding 87 in the actual structure had 864 turns of No. 19 copper wire. In this same device, there were two primary windings 85 and 86, which could be connected in series or in parallel as desired for operation with two different voltages, for example, 120 volts for the windings in parallel and 240 volts for these windings in series.

The primary windings 85 and 86 having terminals 104 and 105 and 106 and 107 respectively, were wound with 260 turns of No. 19 copper wire and winding 86 was provided with a tap including a terminal 108. When primary windings 85 and 86 were connected in parallel, operation was intended to cover voltages from 108 to 132 and when these windings were connected in series, operation was intended to cover the voltage range of 216 to 264, terminal 108, under the series connection case permitting operation over the voltage range of 187 to 239.

Since the output voltage of the invention was intended to be of a low value and high current, secondary windings 88 and 89 of appropriate size and turns were connected to the secondary winding 87. In the actual structure referred to, each of these windings had 18½ turns of No. 8 square copper wire.

It is an important aspect of the invention that the output volt-ampere characteristic of the transformer 79 as further carried out by the D.C. portion 22 be drooping and have an intersection of the characteristics at the operating point of current and voltage desired. To achieve this effect, it is necessary that there be a substantial amount of bucking voltage derived directly from the primary winding and connected in series with the secondary windings 88 and 89. Accordingly, each of the secondary windings 91 and 92 are wound directly over the primary winding and in the construction referred to, consist of 2½ turns each. Since the large load current passes through the windings 91 and 92, these also are of large cross-sectional area, for example, each of the windings consisted of double No. 11 square copper wire. With the use of large copper wire in the windings 88, 89, 91 and 92, the resistance drop in the transformer is maintained at a low value. The compensating bucking windings 91 and 92 are connected to windings 88 and 89 by means of conductors 109 and 111. The common terminnal of windings 91 and 92 is connected by means of conductor 112 to one terminal 113 of the filter network 114. One lead 115 of winding 88 and one lead 116 of winding 89 are connected respectively to rectifiers 117 and 118 from the common terminal of which a conductor 119 extends to the other terminal 121 of filter network 114. The windings 88, 89, 91 and 92 and the rectifiers 117 and 118 are connected in full wave rectification relationship to the filter network. If the current at the intersection of the characteristics 76, 77 and 78 is not quite the value desired, a few laminations may be added or removed from the core 82.

The filter network 114 consists of a choke coil 122 and two filter capacitors 123 and 124, connected in a conventional Pi network. Each of capacitors 123 and 124 in the actual device constructed had capacities of 150,000 microfarads and were rated at 10 volts D.C. The choke 122 was of such value as to reduce ripple in the output of the D.C. portion of the network to 10 millivolts at full load.

The rectifiers 117 and 118 were of the silicon type rated at 25 amperes forward and 50 peak inverse volts and designated as 1N2154 by the manufacturer thereof.

In the device as actually constructed, the side legs 93 and 94 had a length of 6.812 inches, the end legs 95 and 96 had a length of 4.375 inches, the stack was about one and fifteen-sixteenths of an inch in thickness, 24 gauge laminations being used, the transverse dimension or width of the central leg 84 was .875 inch, the width of outer legs 93 and 94 was .750 inch and the length of the air gaps 99 and 103 was .045 inch.

The dimensions of the transformer and of the various other components given throughout the specification are exemplary only, having been found to be satisfactory for the particular unit constructed, it being understood that variations in the various components and factors may be made to adapt other units to different conditions.

The A.C. and D.C. portions 21 and 22, have their output supplied by conductors 25 and 26 to terminals 27 and 28, to which the sensing network is connected by conductors 30 and 40, and to which the load is connected by means of conductors 31 and 32.

The characteristic curves 76, 77 and 78 given on FIG. 4 are an actual plot of the voltages and amperes observed at the output terminals 27 and 28 for the network of the A.C. and D.C. portions 21 and 22, in the absence of the load voltage sensing circuit 23 and the load voltage correcting circuit 24, for input voltages of 108, 120 and 132 applied to windings 85 and 86 connected in parallel. As has already been pointed out, these characteristic curves are close together before the operating point and intersect substantially at the operating point. Beyond the operating point the curves diverge but this is substantially unimportant since no operation in this area is contemplated except under certain fault conditions, as will be described.

For purposes of understanding the operation of the invention with changes in load, FIG. 4 may be considered in connection with the characteristic curve 77 for 120 volts applied to the primary, 60 cycles being the frequency.

The point of intersection of the characteristic curve will be noted as at 8 volts which is the voltage for which the particular device was designed and the current at this intersection was 17.5 amperes, which was also pointed out as representing a current providing a load current at full value, namely 12.5 amperes, plus certain control current necessary to the function of the transistors, etc. Let it be assumed that the external load 29 is at its full value of 12.5 amperes. Under this condition, the current in the shunt circuit should be at a low value, namely only the control current, necessary to maintain the transistors in operation and the voltage should be eight volts. Suppose now that the external load 29 is reduced, that is, its resistance is increased so that the load current decreases.

Referring to FIG. 4, it will be seen that the decrease in current along characteristic 77 results in a slight increase in voltage. This rise in voltage is sensed by the sensing circuit 23 and as the result thereof, the diode 57 conducts more current thereby increasing the voltage across resistor 63. This causes the transistor 58 to conduct less collector to emitter current (that is less current from the emitter to base of transistor 59), thereby causing transistor 59 to conduct less current in its emitter to collector circuit. There is therefore a decrease in current through resistor 72, which causes the voltage thereacross to fall thereby permitting more current to flow in the emitter to base circuit of transistor 43, and consequently permitting the transistors 35, 36, 39 etc. to conduct more current as already described. The increased current through transistors 35, 36, 39 etc. and through resistors 37, 38, 41 etc. increases the current flowing from the A.C. and D.C. portions 21 and 22, and by reference to FIG. 4, it will be seen that this increased current will cause the voltage to fall along characteristic 77. The sensing circuit permits the shunt circuit to conduct a large current, whereby the voltage will fall along characteristic 77 and the sensing circuit would operate in the reverse direction to reduce the current taken by the shunt circuit, thereby permitting the voltage to rise. However, as a result of the current feedback discussed above from transistors 35, 36 and 39 through transistors 42 and 43 a voltage appears across resistor 72 which is fed back through resistor 74 as positive or regenerative current feedback. The final operating point at which the regulating action ceases will be the point at which the circuit is designed to operate, namely 8 volts although by selection of the feedback components this point may be varied substantially. The total time for this circuit to recover from a voltage change due to load change has been found to be no more than 40 microseconds for a change in load from no load to full load.

It will be understood that for decreases in load as has been described and operation along the characteristics 76 and 78, namely at 108 and 130 volts, line supply respectively, the functioning will be substantially the same and final state of operation will occur at the point of intersection of these characteristics.

Now let it be assumed that the load 29 is at zero and is increased, which is to say, that the resistance 29 is decreased whereby increased load current flows. The current in the shunt circuit is equal to the full load current of 12.5 amperes and control current or 17.5 amperes. Referring to FIG. 4 and characteristic 77, it will be observed that an increase in current beyond 17.5 amperes will cause a decrease in voltage below eight volts. The decrease in voltage is sensed by the sensing circuit 23, whereby less current flows in resistance 63 with a consequent decrease in voltage on the emitter of transistor 58. This permits increased current to flow in the collector to emitter circuit of transistor 58 and consequently increased current in the emitter to base circuit of transistor 59, which in turn causes increased current in the emitter to collector circuit of transistor 59. The latter current flows through resistance 72 causing its voltage to rise thereby causing transistor 43 to conduct less current in its emitter to base circuit, which in turn, as explained, causes less current to flow in the shunt circuit of transistors 35, 36, 39 etc. and resistors 37, 38, 41 etc. This decrease in shunt circuit current will cause the voltage to rise to the point of intersection of characteristics 76, 77 and 78 and because of the feedback from transistors 35, 36 and 39 through transistors 42 and 43 the potential across resistor 72 rises disproportionately and is regeneratively fed back to the base of transistor 58 through resistor 74 stabilizing the circuit at the desired point.

A circuit designed and constructed as described has been found to have a regulation of 6 millivolts or .075% from no load to full load on a static basis and has a no load to full load undershoot and a full load to no load overshoot of .58%. This may be varied by the selection of the particular capacitor 75.

The diodes 61 and 62 are placed in a circuit as shown so as to produce a voltage drop with temperature which will compensate for the change in condition of the various transistors for changes in temperature.

The rapid fall to zero voltage of characteristics 76, 77 and 78 is a further advantage of the transformer-capacitor 79. Thus when the apparatus is first connected to the line and the capacitors 123 and 124 are discharged, these capacitors are a virtual short-circuit of transformer-capacitor 79. The rectifiers 117 and 118 cannot withstand large overload currents and are prevented therefrom by the fact that the short circuit current of the complete circuit is the current at zero volts as shown in FIG. 4.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit connected to said pair of terminals and being responsive to changes in the D.C. voltage across said terminals to conduct current in direct relationship to changes in said D.C. voltage of said load, and a network connected between such source and said terminals for supplying a substantially constant D.C. current of essentially full load value plus control currents at said D.C. voltage to said terminals irrespective of variations within the specified range of such A.C. voltage magnitude, said network having volt-ampere characteristics at the extremities of said specified range of variation of such A.C. voltage magnitude, which characteristics are drooping and intersect at substantially the value of said full load current plus control current and said certain D.C. voltage.

2. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit connected to said pair of terminals and being responsive to changes in the D.C. voltage across said terminals to conduct current in direct relationship to changes in said D.C. voltage, and a network including a high reactance transformer and capacitor combination, a rectifier and a filter connected between such source and said terminals for supplying a substantially constant D.C. current of essentially full load value plus control currents at said D.C. voltage to said terminals irrespective of variations within the specified range of such A.C. voltage magnitude, said network having volt-ampere characteristics at the extremities of said specified range of variation of such A.C. voltage magnitude, which characteristics are drooping and intersect at substantially the value of said full load current plus control current and said certain D.C. voltage.

3. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit connected to said pair of terminals, means responsive to changes in the D.C. voltage across said terminals for controlling the current passed by said shunt circuit to be in direct relationship to changes in said D.C. voltage, and a network including a high reactance transformer and capacitor combination, a rectifier and a filter connected between such source and said terminals for supplying a substantially constant D.C. current of essentially full load value plus control current at said D.C. voltage to said terminals irrespective of variations within the specified range of such A.C. voltage magnitude, said network having volt-ampere characteristics at the extremities of said specified range of variation of such A.C. voltage magnitude, which characteristics are drooping and intersect at substantially the value of said full load current plus control current and said certain D.C. voltage.

4. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit including constant resistance means and variable resistance means connected to said pair of terminals, means responsive to changes in the D.C. voltage across said terminals for controlling said variable resistance means to pass current in said shunt circuit in direct relationship to said D.C. voltage, and a network including a high reactance transformer and capacitor combination, a rectifier and a filter connected between such source and said terminals for supplying a substantially constant D.C. current of essentially full load value plus control current at said D.C. voltage to said terminals irrespective of variations within the specified range of such A.C. voltage magnitude, said network having volt-ampere characteristics at the extremities of said specified range of variation of such A.C. voltage magnitude, which characteristics are drooping and intersect at substantially the value of said full load current plus control current and said certain D.C. voltage.

5. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit including constant resistance means and variable resistance means connected in series to said pair of terminals, the lowest value of said variable resistance means being substantially less than the value of said constant resistance means, means responsive to changes in the D.C. voltage across said terminals for controlling said variable resistance means to pass current in said shunt circuit in inverse relationship to the current of said load, and a network including a high reactance transformer and capacitor combination, a rectifier and a filter connected between such source and said terminals for supplying a substantially constant D.C. current of essentially full load value plus control current at said D.C. voltage to said terminals irrespective of variations within the specified range of such A.C. voltage magnitude, said network having volt-ampere characteristics at the extremities of said specified range of variation of such A.C. voltage magnitude, which characteristics are drooping and intersect at substantially the value of said full load current plus control current and said certain D.C. voltage.

6. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit including constant resistance means and transistor means in series connected to said pair of terminals, the lowest resistance value of said transistor means being substantially less than the value of said constant resistance means, means responsive to changes in the D.C. voltage across said terminals for controlling said transistor means to pass current in said shunt circuit in inverse relationship to the current of said load, and a network including a high reactance transformer and capacitor combination, a rectifier and a filter connected between such source and said terminals for supplying a substantially constant D.C. current of essentially full load value plus control current at said D.C. voltage to said terminals irrespective of variations within the specified range of such A.C. voltage magnitude, said network having volt-ampere characteristics at the extremities of said specified range of variation of such A.C. voltage magnitude, which characteristics are drooping and intersect at substantially the value of said full load current plus control current and said certain D.C. voltage.

7. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit including constant resistance means and transistor means in series connected to said pair of terminals, the total resistance value of said constant resistance means and the lowest resistance value of said transistor means being substantially equal to the resistance of such load at full load current value and the said lowest resistance value of said transistor being substantially less than the said value of said constant resistance means, means responsive to changes in the D.C. voltage across said terminals for controlling said transistor means to pass current in said shunt circuit in inverse relationship to the current of said load, and a network including a high reactance transformer and capacitor combination, a rectifier and a filter connected between such source and said terminals for supplying a substantially constant D.C. current of essentially full load value plus control current at said D.C. voltage to said terminals irrespective of variations within the specified range of such A.C. voltage magnitude, said network having volt-ampere characteristics at the extremities of said specified range of variation of such A.C. voltage magnitude, which characteristics are drooping and intersect at substantially the value of said full load current plus control current and said certain D.C. voltage.

8. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit including constant resistance means and variable resistance means connected to said pair of terminals, means for sensing changes in the D.C. voltage across said terminals, amplifying means responsive to said sensing means for controlling said variable resistance means to pass current in said shunt circuit in inverse relationship to the current of said load, and a network including a high reactance transformer and capacitor combination, a rectifier and a filter connected between such source and said terminals for supplying a substantially constant D.C. current of essentially full load value plus control current at said certain D.C. voltage to said terminals irrespective of variations within the specified range of such A.C. voltage magnitude, said network having volt-ampere characteristics at the extremities of said specified range of variation of such A.C. voltage magnitude, which characteristics are drooping and intersect at substantially the value of said full load current plus control current and said certain D.C. voltage.

9. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit including constant resistance means and transistor means in series connected to said pair of terminals, the total resistance value of said constant resistance means and the lowest resistance value of said transistor means being substantially equal to the resistance of such load at full load current value and the said lowest resistance value of said transistor being substantially less than the said value of said constant resistance means, means for sensing changes in the D.C. voltage across said terminals effected by changes in said external load, amplifying means responsive to said sensing means for controlling said transistor means to pass current in said shunt circuit in inverse relationship to the current of said load, and a network including a high reactance transformer and capacitor combination, a rectifier and a filter connected between such source and said terminals for supplying a substantially constant D.C. current of essentially full load value plus control current at said certain D.C. voltage to said terminals irrespective of variations within the specified range of such A.C. voltage magnitude, said network having volt-ampere characteristics at the extremities of said specified range of variation of such A.C. voltage magnitude, which characteristics are drooping and intersect at substantially the value of said full load current plus control current and said certain D. C. voltage.

10. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit connected to said pair of terminals, means for varying the current through said shunt circuit in inverse relationship to the current of such load, means responsive to variations in such load for controlling said current varying means, and a network connected between such source and said terminals for supplying a substantially constant D.C. current to said terminals irrespective of variations within the specified range of such A.C. voltage magnitude.

11. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit connected to said pair of terminals, means for varying the current through said shunt circuit in inverse relationship to the current of such load, means responsive to variations in such load for controlling said current varying means, and a network having a drooping volt-ampere output characteristic at said full load current plus control current and said certain D.C. voltage connected between such source and said terminals for supplying a substantially constant D.C. current of essentially said full load value plus control current at said certain D.C. voltage to said terminals irrespective of variations within the specified range of such A.C. voltage magnitude.

12. Regulating apparatus for supplying a certain D.C. voltage to an external load at a pair of terminals from an A.C. voltage source of nominal voltage and frequency, irrespective of variations in such load within a specified range and irrespective of variations in such magnitude within a specified range comprising, a shunt circuit including transistor means connected to said pair of terminals, first means for controlling said transistor means to pass current in inverse proportion to the current of such load, means responsive to variations in such load for controlling said first means, and a network having a relatively steep drooping volt-ampere output characteristic at said full load current plus control current and said certain D.C. voltage connected between such source and said terminals for supplying a substantially constant D.C. current of essentially said full load value plus control current at said certain D.C. voltage to said terminals irrespective of variations within the specified range of such A.C. voltage magnitude.

13. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit connected to said pair of terminals, means for varying the current through said shunt circuit in inverse relationship to the current of such load, means responsive to variations in such load for controlling said current varying means, and a network comprising a high reactance transformer and capacitor combination, a rectifier and a filter and having a relatively steep drooping output volt-ampere characteristic at said full load current plus control current and said certain D.C. voltage for connection between such source and said terminals for supplying a substantially constant D.C. current of essentially said full load value plus control current at said certain D.C. voltage to said terminals irrespective of variations within the specified range of such A.C. voltage magnitude.

14. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit connected to said pair of terminals and being responsive to changes in the D.C. voltage across said terminals effected by changes in such external load to conduct current in inverse relationship to the current of such load, and a network having a relatively steep drooping volt-ampere output characteristic at said full load current plus control current and said certain D.C. voltage connected between such source and said terminals for supplying a substantially constant D.C. current of essentially said full load value plus control current at said certain D.C. voltage to said terminals irrespective of variations within the specified range of such A.C. voltage magnitude.

15. Regulating apparatus for supplying a certain D.C. voltage to an external load at a pair of terminals from an A.C. voltage source of nominal magnitude and frequency, irrespective of variations in such load within a specified range and irrespective of variations in such magnitude within a specified range comprising, a shunt circuit connected to said pair of terminals and being responsive to changes in the D.C. voltage across said terminals effected by changes in such external load to conduct current in inverse relationship to the current of such load, and a nework comprising a high reactance transformer and capacitor combination, a rectifier and a filter and having a relatively steep drooping volt-ampere output characteristic at said full load current plus control current and said certain D.C. voltage connected between such source and said terminals for supplying a substantially constant D.C. current of essentially said full load value plus control current at said D.C. voltage to said terminals irrespective of variations within the specified range of such A.C. voltage magnitude.

16. Regulating apparatus for supplying a certain voltage to an external load at a pair of terminals from an A.C. voltage source of nominal magnitude and frequency, irrespective of variations in such load within a specified range and irrespective of variations in such magnitude within a specified range comprising a shunt circuit connected to said pair of terminals and being responsive to changes in the voltage across said terminals effected by changes in said external load to conduct current in inverse relationship to the current of said load, and a network connected between such source and said terminals for supplying a substantially constant current of essentially full load value plus control current at said voltage to said terminals irrespective of variations within the specified range of such A.C. voltage magnitude, said network having volt-ampere characteristics at the extremities of said specified range of variation of such A.C. voltage magnitude, which characteristics are drooping and intersect at substantially the value of said full load current plus control current and said certain voltage.

17. Regulating apparatus for maintaining a certain D.C. voltage to an external load at a pair of output terminals from a D.C. voltage source which is free of magnitude variations at such output terminals attributable to line variations within a specified range comprising, a shunt circuit including constant resistance means and variable resistance means in series connected to said pair of terminals, the total resistance value of said constant resistance means and the lowest resistance value of said variable resistance means being substantially equal to the resistance of such load at full load current value and the said lowest resistance value of said variable resistance means being substantially less than the said value of said constant resistance means, and means responsive to changes in the D.C. voltage across said terminals effected by changes in said external load for controlling said variable resistance means to pass current in said shunt circuit in inverse relationship to the current of said load.

18. Regulating apparatus for maintaining a certain D.C. voltage to an external load at a pair of output terminals from a D.C. voltage source which is free of magnitude variations at such output terminals attributable to line variations within a specified range comprising, a shunt circuit including constant resistance means and transistor means in series connected to said pair of terminals, the total resistance value of said constant resistance means and the lowest resistance value of said transistor means being substantially equal to the resistance of such load at full load current value and the said lowest resistance value of said transistor means being substantially less than the said value of said constant resistance means, and means responsive to changes in the D.C. voltage across said terminals effected by changes in said external load for controlling said transistor means to pass current in said shunt circuit in inverse relationship to the current of said load.

References Cited in the file of this patent

UNITED STATES PATENTS

| | | |
|---|---|---|
| 2,381,715 | Boehlen et al. | Aug. 7, 1945 |
| 2,730,668 | Edelman | Jan. 10, 1956 |
| 2,850,694 | Hamilton | Sept. 2, 1958 |
| 2,850,695 | Bishop | Sept. 2, 1958 |
| 2,889,512 | Ford et al. | June 2, 1959 |
| 2,917,700 | Chase | Dec. 15, 1959 |